US012039935B2

(12) United States Patent
Kim et al.

(10) Patent No.: US 12,039,935 B2
(45) Date of Patent: Jul. 16, 2024

(54) PIXEL CIRCUIT AND DISPLAY DEVICE INCLUDING THE SAME

(71) Applicant: LG Display Co., Ltd., Seoul (KR)

(72) Inventors: Kyu Jin Kim, Paju-si (KR); Dong Hyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/368,930

(22) Filed: Sep. 15, 2023

(65) Prior Publication Data

US 2024/0203345 A1 Jun. 20, 2024

(30) Foreign Application Priority Data

Dec. 16, 2022 (KR) ........................ 10-2022-0176759

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/0243* (2013.01); *G09G 2310/027* (2013.01); *G09G 2320/0233* (2013.01); *G09G 2320/043* (2013.01)

(58) Field of Classification Search
CPC ......... G09G 3/3233; G09G 2300/0426; G09G 2300/0842; G09G 2320/0233; G09G 2320/043; G09G 2310/0243; G09G 2310/027
See application file for complete search history.

(56) References Cited

U.S. PATENT DOCUMENTS 11,626,069 B2 * 4/2023 Lai ........................ G09G 3/3233 345/204
11,769,447 B2 * 9/2023 Lee ...................... G09G 3/3208 345/76
11,804,171 B2 * 10/2023 Park .......................... G09G 3/32
11,830,418 B2 * 11/2023 Liu ...................... G09G 3/3426
11,830,443 B2 * 11/2023 Kim ..................... G09G 3/3291
11,854,480 B2 * 12/2023 Yu ......................... G09G 3/3233
11,855,055 B2 * 12/2023 Bok ........................ H01L 27/12
11,862,104 B2 * 1/2024 Heo ..................... G09G 3/3291
11,882,742 B2 * 1/2024 Son ....................... H01L 27/124
11,922,879 B2 * 3/2024 Gao ..................... H10K 59/121

FOREIGN PATENT DOCUMENTS

KR 10-2022-0013676 A 2/2022

* cited by examiner

*Primary Examiner* — Doon Y Chow
(74) *Attorney, Agent, or Firm* — Birch, Stewart, Kolasch & Birch, LLP

(57) ABSTRACT

A pixel circuit can include a driving element connected to a first node, a second node and a third node; a first switch element supplying an initialization voltage to the second node; a second switch element supplying a data voltage to a fourth node; and a capacitor connected between the third node and the fourth node. Also, the pixel circuit can further include a third switch element supplying a reference voltage to the third node; a fourth switch element supplying a pixel driving voltage to the first node; a fifth switch element electrically connecting the fourth node with the second node; a light emitting element driven to emit light based on a current supplied through the driving element; and a sixth switch element configured to electrically connect the third node with a fifth node connected to an anode electrode of the light emitting element.

21 Claims, 18 Drawing Sheets

PIXEL CIRCUIT AND DISPLAY DEVICE INCLUDING THE SAME

CROSS-REFERENCE TO RELATED APPLICATION

This application claims priority to Korean Patent Application No. 10-2022-0176759, filed in the Republic of Korea on Dec. 16, 2022, the entirety of which is hereby expressly incorporated by reference into the present application.

BACKGROUND

1. Field

The present disclosure relates to a pixel circuit and a display device including the same.

2. Discussion of Related Art

Electroluminescent display devices are generally classified into inorganic light emitting display devices and organic light emitting display devices according to the materials of the light emitting layers. Active matrix type organic light emitting display devices include organic light-emitting diodes (hereinafter referred to as "OLEDs"), which emit light by themselves (e.g., no backlight unit is needed), and have fast response speeds and advantages of high light emission efficiencies, improved brightness, and wide viewing angles.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color (e.g., true black), the organic light-emitting display devices are excellent in a contrast ratio and color reproducibility.

Pixels of an organic light emitting display (OLED) device include a pixel circuit including a driving element for driving the OLED, and a capacitor connected to the driving element.

Due to process deviations and device characteristic deviations resulting from the manufacturing process of the display panel, there can be differences in the electrical characteristics of the driving element for each pixel. These differences can increase or become more pronounced over time as the driving time of the pixels becomes longer. In order to compensate for the differences in the electrical characteristics of the driving element for each pixel, an internal compensation circuit can be added to the pixel circuit. The internal compensation circuit can sample a threshold voltage of the driving element and compensate a gate voltage of the driving element by the amount of the threshold voltage of the driving elements.

Also, compensation can occur upon power up or power down of the device. However, there is a need to be able compensate threshold voltage of a driving element in real-time. Also, there is a need for being able to provide a internal compensation circuit that does not need to use p-channel low temperature polysilicon (LTPS) transistors, which can be difficult and expensive to manufacture.

In addition, there is a need to be able to provide a low-power operation for a low-speed operation mode that does not degrade image quality.

SUMMARY OF THE DISCLOSURE

The present disclosure has been made in an effort to address aforementioned necessities and/or drawbacks.

The present disclosure provides a pixel circuit capable of compensating a threshold voltage of a driving element in real-time using an internal compensation circuit implemented with N-channel transistors, and a display device including the pixel circuit.

The problems or limitations to be solved or addressed by the present disclosure are not limited to those mentioned above, and other problems or limitations not mentioned will be clearly understood by those skilled in the art from the following description.

A pixel circuit according to one embodiment of the present disclosure includes: a driving element including a first electrode connected to a first node, a gate electrode connected to a second node, and a second electrode connected to a third node; a first switch element configured to supply an initialization voltage to the second node in response to a first gate signal; a second switch element configured to supply a data voltage to a fourth node in response to a second gate signal; a capacitor connected between the third node and the fourth node; a third switch element configured to supply a reference voltage to the third node in response to a third gate signal; a fourth switch element configured to supply a pixel driving voltage to the first node in response to a fourth gate signal; a fifth switch element configured to connect the fourth node to the second node in response to a fifth gate signal; a light emitting element configured to be driven by a current supplied through the driving element, including an anode electrode connected to the fifth node and a cathode electrode to which a cathode voltage lower than the pixel driving voltage is applied; and a sixth switch element configured to connect the third node to the fifth node in response to the fifth gate signal.

The data voltage can be a voltage in which the initialization voltage is added to a dynamic voltage. The dynamic voltage can vary according to a grayscale value of pixel data.

A driving period of the pixel circuit can include: an initialization period during which the pixel circuit is initialized; a sampling period during which a threshold voltage of the driving element and the data voltage are stored in the capacitor; and a light emission period during which the light emitting element is driven.

A voltage of the first gate signal can be a gate-on voltage during the initialization period and the sampling period, and a gate-off voltage during the light emission period. A voltage of the second gate signal can be generated as a pulse of the gate-on voltage synchronized with the data voltage during the sampling period, and can be the gate-off voltage during the initialization period and the light emission period. A voltage of the third gate signal can be generated as a pulse of the gate-on voltage during the initialization period, and can be the gate-off voltage during the sampling period and the light emission period. A voltage of the fourth gate signal can be the gate-on voltage during the sampling period and the light emission period, and can be generated as a pulse of the gate-off voltage during the initialization period. A voltage of the fifth gate signal can be the gate-on voltage during the initialization period and the light emission period, and can be generated as a pulse of the gate-off voltage during the sampling period. Each of the switch elements is turned on in response to the gate-on voltage and turned off according to the gate-off voltage.

A pixel circuit according to another embodiment of the present disclosure includes: a driving element including a first electrode connected to a first node, a gate electrode connected to a second node, and a second electrode connected to a third node; a first switch element configured to supply an initialization voltage to a fourth node in response to a first gate signal; a second switch element configured to supply a data voltage to the fourth node in response to a second gate signal; a capacitor connected between the third node and the fourth node; a third switch element configured to supply a first reference voltage to the third node in response to the first gate signal; a fourth switch element configured to supply a pixel driving voltage to the first node in response to a third gate signal; a fifth switch element configured to connect the fourth node to the second node in response to a fourth gate signal; a light emitting element configured to be driven by a current supplied through the driving element, including an anode electrode connected to the fifth node and a cathode electrode to which a cathode voltage lower than the pixel driving voltage is applied; and a sixth switch element configured to connect the third node to the fifth node in response to the fourth gate signal.

The pixel circuit can further include a seventh switch element configured to apply the initialization voltage to the second node in response to the second gate signal.

The pixel circuit can further include an eighth switch element configured to apply a second reference voltage to the fifth node in response to the first gate signal or the second gate signal.

A driving period of the pixel circuit can include: an initialization period during which the pixel circuit is initialized; a sampling period during which a threshold voltage of the driving element and the data voltage are stored in the capacitor; and a light emission period during which the light emitting element is driven, A voltage of the first gate signal can be generated as a pulse of a gate-on voltage during the initialization period, and can be a gate-off voltage during the sampling period and the light emission period. A voltage of the second gate signal can be generated as a pulse of the gate-on voltage synchronized with the data voltage during the sampling period, and can be the gate-off voltage during the initialization period and the light emission period. A voltage of the third gate signal can be the gate-on voltage during the sampling period and the light emission period, and can be generated as a pulse of the gate-off voltage during the initialization period. A voltage of the fourth gate signal can be the gate-on voltage during the light emission period, and can be generated as a pulse of the gate-off voltage during the initialization period and the sampling period. Each of the switch elements is turned on in response to the gate-on voltage and turned off according to the gate-off voltage.

A display device of the present disclosure includes any one of the pixel circuits.

According to the present disclosure, it is possible to provide a pixel circuit that is capable of compensating the threshold voltage of the driving element in real time using the internal compensation circuit, and the display device including the pixel circuit.

According to the present disclosure, by short circuiting the capacitor of the pixel circuit to the gate of the driving element through a switch element, data writing and Vth sampling of the driving element can proceed simultaneously.

According to the present disclosure, it is possible to implement a pixel circuit suitable for a medium-size or larger display device, for which is difficult to stably form a p-channel low temperature polysilicon (LTPS) transistor, by using an n-channel oxide transistor-based pixel circuit.

According to the present disclosure, it is possible to implement a low-power operation by providing a low-speed operation mode that does not degrade image quality.

Effects which can be achieved by the present disclosure are not limited to the above-mentioned effects. For example, other objects that are not mentioned can be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION OF THE EMBODIMENTS

Figure 1:
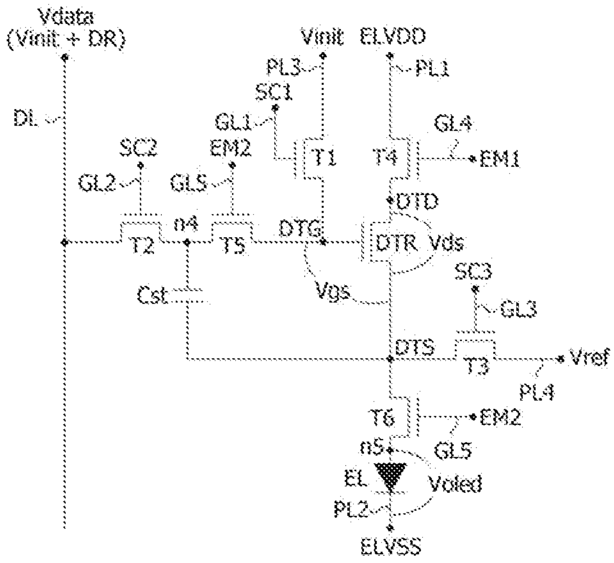
FIG. 1 is a circuit diagram illustrating a pixel circuit according to an embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as “comprising,” “including,” “having,” etc. used herein are generally intended to allow other components to be added unless the terms are used with the term “only.” Any references to singular can include plural unless expressly stated otherwise.

Components are interpreted to include an ordinary error range even if not expressly stated.

When a positional or interconnected relationship is described between two components, such as “on top of,”

"above," "below," "next to," "connect or couple with," "crossing," "intersecting," or the like, one or more other components can be interposed between them, unless "immediately" or "directly" is used.

When a temporal antecedent relationship is described, such as "after," "following," "next to," "before," or the like, it may not be continuous on a time base unless "immediately" or "directly" is used.

The terms "first," "second," and the like can be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device can include a plurality of transistors. The transistor can be implemented as a TFT (Thin Film Transistor). The transistors can be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor (p-channel metal-oxide semiconductor (PMOS)), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

Agate signal swings between a gate-on voltage and a gate-off voltage. A transistor is turned on in response to a gate-on voltage and is turned off in response to a gate-off voltage. In the situation of an n-channel transistor, the gate-on voltage can be a gate high voltage, and the gate-off voltage can be a gate low voltage.

Hereinafter, various embodiments of the present disclosure will be described in detail with reference to the accompanying drawings. All the components of each pixel circuit and each display device according to all embodiments of the present disclosure are operatively coupled and configured.

Figure 2:
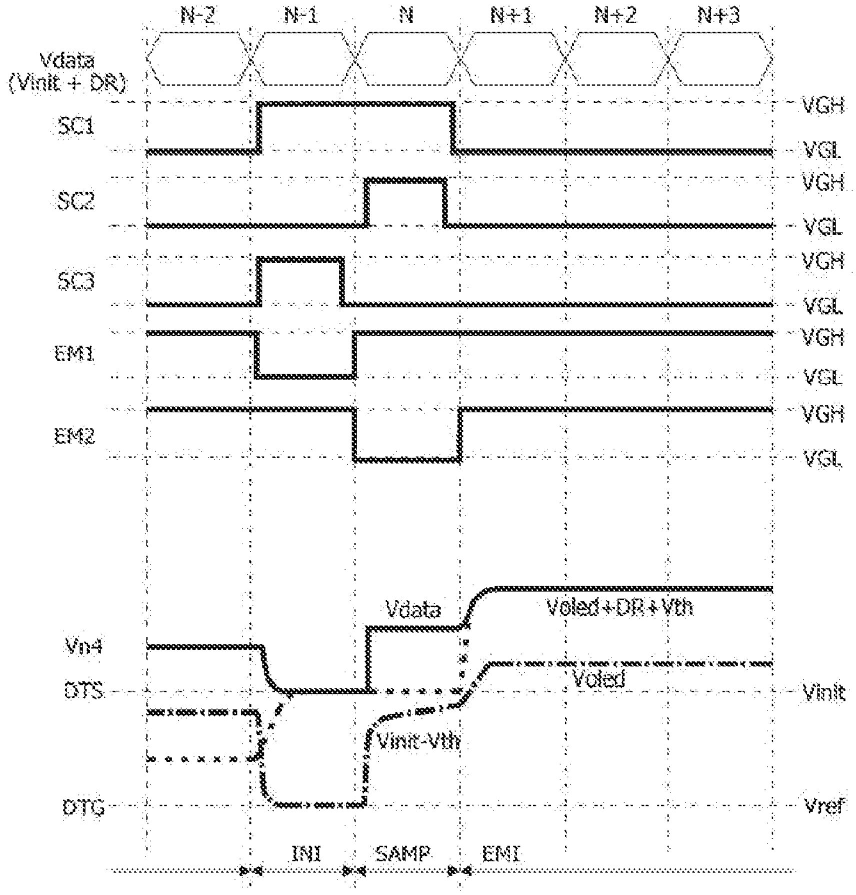
FIG. 2 is a waveform diagram illustrating gate signals applied to the pixel circuit shown in FIG. 1 and voltages of its main nodes according to an embodiment of the present disclosure.

FIG. 1 is a circuit diagram illustrating a pixel circuit according to a first embodiment of the present disclosure. FIG. 2 is a waveform diagram illustrating gate signals applied to the pixel circuit shown in FIG. 1 and voltages of its main nodes according to an embodiment of the present disclosure.

Referring to FIGS. 1 and 2, the pixel circuit includes a light emitting element EL, a driving element DTR for driving the light emitting element EL, a plurality of switch elements T1 to T6, and a capacitor Cst. The driving element DTR and the switch elements T1 to T6 can be implemented as n-channel oxide TFTs. Each of the switch elements T1 to T6 is turned on in response to a gate-on voltage VGH and is turned off in response to a gate-off voltage VGL.

The pixel circuit is connected to a data line DL to which a data voltage Vdata is applied, and to gate lines GL1 to GL5 to which gate signals SC1, SC2, SC3, EM1, and EM2 are applied. The pixel circuit is connected to power nodes to which DC voltages (or constant voltages) are applied, such as a first constant voltage node PL1 to which a pixel driving voltage ELVDD is applied, a second constant voltage node PL2 to which a cathode voltage ELVSS is applied, a third constant voltage node PL3 to which an initialization voltage Vinit is applied, and a fourth constant voltage node PL4 to which a reference voltage Vref is applied. On the display panel, the power lines to which the constant voltage nodes are connected can be commonly connected to all of pixels.

A voltage to drive the light emitting element can be designed based on the pixel driving voltage ELVDD. In an embodiment according to the present disclosure, the data voltage Vdata is given by Vdata=Vinit+DR in which a dynamic voltage DR capable of expressing grayscale is added to the initialization voltage Vinit.

The dynamic voltage DR of the data voltage Vdata has a voltage range between a maximum voltage (White_data) corresponding to a white grayscale value of the pixel data and a minimum voltage (Black_data) corresponding to a black grayscale value of the pixel data. The dynamic voltage DR of the data voltage Vdata is a grayscale voltage selected by a digital to analog converter (DAC) of a data driver according to the grayscale value of the pixel data. Therefore, the dynamic voltage DR of the pixel data varies in its voltage level according to the grayscale value of the pixel data.

When a voltage difference between the pixel driving voltage ELVDD and the cathode voltage ELVSS is Vel, Vel=ELVDD−ELVSS and can be set to Vel>(White_data−Vinit)+White_Voled under the condition that the driving element DTR operates in a saturation region (Vgs<Vds). Here, White_data is the maximum voltage corresponding to the white grayscale value in the dynamic voltage DR of the data voltage Vdata. White_Voled is a voltage above a threshold voltage of the light emitting element EL at which the light emitting element EL can be emitted with maximum luminance. The initialization voltage Vinit can be set to a voltage that satisfies Vinit>White_data+White_Voled−Vel. Voled is a voltage between an anode electrode and a cathode electrode of the light emitting element EL when the light emitting element EL is driven.

The reference voltage Vref can be set to a voltage satisfying Vref≤Vinit−DR−Vth in order to secure a potential difference for initializing the capacitor Cst. Here, 'Vth' is the threshold voltage of the driving element DTR. The gate signals SC1, SC2, SC3, EM1, and EM2 swing between the gate-on voltage VGH and the gate-off voltage VGL. An example of a voltage applied to pixels can be shown in Table 1 below, but is not limited thereto since the voltage can vary depending on the characteristics of a display panel and application models thereof.

TABLE 1

| | |
|---|---|
| ELVDD | 18[V] |
| ELVSS | −2[V] |

TABLE 1-continued

| | |
|---|---|
| SC1, SC2, SC3, EM1, and EM2 | −10[V]~20[V] |
| Vinit | 2[V] |
| Vref | −8[V] |
| DR (White_data − Black_data) | 4[V] White_data: 6[V] Black_data: 2[V] |
| White_Voled | 6[V] |

As shown in Table 1, the pixel driving voltage ELVDD is a constant voltage that is higher than the maximum voltage of the dynamic voltage, e.g., White_data, and the cathode voltage ELVSS is a constant voltage that is lower than the pixel driving voltage ELVDD. The initialization voltage Vinit can be a constant voltage that is set to a voltage equal to the minimum voltage of the dynamic voltage, e.g., the voltage of Black_data. The reference voltage Vref can be a constant voltage lower than the cathode voltage ELVSS. Each of the gate signals SC1, SC2, SC3, EM1, and EM2 includes a pulse that swings between the gate-off voltage VGL and the gate-on voltage VGH. The gate-on voltage VGH can be a constant voltage higher than the pixel driving voltage ELVDD. The gate-off voltage VGL can be a constant voltage lower than the cathode voltage ELVSS and the reference voltage Vref. In Table 1, the gate-off voltage VGL is −10 [V] and the gate-on voltage VGH is 20 [V] for each of the gate signals SC1, SC2, SC3, EM1, and EM2.

A driving period of the pixel circuit includes an initialization period INI, a sampling period SAMP, and a light emission period EMI determined by waveforms of the gate signals SC1, SC2, SC3, EM1, and EM2 as shown in FIG. 2. The driving period of the pixel circuit is adjustable with the waveforms of the gate signals SC1, SC2, SC3, EM1, and EM2. In FIG. 2, each of (N−2)th to (N+3)th horizontal periods (N−2 to N+3) corresponds to one horizontal period (1H). N is a natural number. An (N−1)th horizontal period (N−1) can be the initialization period INI of an Nth pixel lines in a current frame, and an Nth horizontal period N can be the sampling period SAMP of the Nth pixel lines in the current frame. (N+1)th to (N+3)th horizontal periods (N+1 to N+3) can be the light emission period EMI of the Nth pixel line in the current frame. In FIG. 2, 'Vn4' denotes a voltage of a fourth node n4, "DTG" denotes a voltage of a second node DTG, and "DTS" denotes a voltage of a third node DTS.

In the situation of a pixel circuit in which the Nth pixel data is written, the data voltage Vdata of the Nth pixel data is charged in the Nth horizontal period N, as shown in FIG. 2. In FIG. 2, the initialization period INI is the (N−1)th horizontal period (N−1), and the sampling period SAMP is the Nth horizontal period N. And, the light emission period EMI is the (N+1)th to the (N+3)th horizontal periods (N+1 to N+3). In FIG. 2, the (N−2)th horizontal period (N−2) is the light emission period EMI in which the light emitting element EL is emitted with a luminance corresponding to a grayscale value of pixel data in a previous frame.

A voltage of the first gate signal SC1 is the gate-on voltage VGH during the initialization period INI and the sampling period SAMP, and the gate-off voltage VGL during the light emission period EMI. A voltage of the second gate signal SC2 is generated as a pulse of the gate-on voltage VGH synchronized with the data voltage Vdata during the sampling period SAMP, and the gate-off voltage VGL during the initialization period INI and the light emission period EMI. A voltage of the third gate signal SC3 is generated as a pulse of the gate-on voltage VGH during the initialization period INI and the gate-off voltage VGL during the sampling period SAMP and the light emission period EMI.

The pulse of the first gate signal SC1 can be generated as the gate-on voltage VGH during two horizontal periods (2H) including the (N−1)th and the Nth horizontal period (N−1 and N). The pulse of the second gate signal SC2 can be generated as the gate-on voltage VGH during one horizontal period (1H) including the Nth horizontal period N. The pulse of the third gate signal SC3 can be generated as the gate-on voltage VGH during the one horizontal period (1H) including the (N−1)th horizontal period N. Therefore, the first half of the pulse of the first gate signal SC1 can overlap with the pulse of the third gate signal SC3, and the second half of the pulse of the first gate signal SC1 can overlap with the pulse of the second gate signal SC2.

A voltage of the fourth gate signal EMI is the gate-on voltage VGH during the sampling period SAMP and the light emission period EMI, and is generated as a pulse of the gate-off voltage VGL during the initialization period INI. A voltage of the fifth gate signal EM2 is the gate-on voltage VGH during the initialization period INI and the light emission period EMI, and is generated as a pulse of the gate-off voltage VGL during the sampling period SAMP.

The driving element DTR generates a current according to a gate-source voltage Vgs to drive the light emitting element EL. The driving element DTR includes a first electrode connected to a first node DTD, a gate electrode connected to the second node DTG, and a second electrode connected to the third node DTS.

The light emitting element EL can be implemented as an OLED. The light emitting element EL includes an anode electrode, a cathode electrode, and an organic compound layer formed between the electrodes. The anode electrode of the light emitting element EL is connected to a fifth node n5, and the cathode electrode is connected to the second constant voltage node PL2 to which the cathode voltage ELVSS is applied. The organic compound layer can include, but is not limited to, a hole injection layer (HIL), a hole transport layer (HTL), an light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this situation, visible light is emitted from the emission layer (EML). The light emitting element EL can be implemented as a tandem structure with a plurality of light emitting layers stacked on top of each other. The light emitting element EL having the tandem structure can improve the luminance and the lifespan of pixels.

The capacitor Cst is connected between the third node DTS and the fourth node n4. The capacitor Cst stores the data voltage Vdata to which the threshold voltage Vth of the driving device DTR, sampled during the sampling period SAMP is added, and maintains the gate-source voltage Vgs of the driving element DTR, boosted during the light emission period EMI. Also, the second switch element T2 and the fifth switch element T5 can be connected in series, and a first capacitor electrode of the capacitor Cst can be connected to the fourth node n4 located between the second switch element and the fifth switch element, and a second capacitor electrode of the capacitor Cst can be connected to the third node DTS located between the driving element and the sixth switch element.

The switch elements T1 to T6 of the pixel circuit include a first switch element T1 that supplies the initialization voltage Vinit to the second node DTG in response to the first gate signal SC1, a second switch element T2 that supplies the data voltage Vdata to the fourth node n4 in response to the second gate signal SC2, a third switch element T3 that supplies the reference voltage Vref to the third node DTS in response to the third gate signal SC3, a fourth switch element T4 that supplies the pixel driving voltage ELVDD to the first node DTD in response to the fourth gate signal EM1, a fifth switch element T5 that connects the fourth node n4 to the second node DTG in response to the fifth gate signal EM2, and a sixth switch element T6 that connects the third node DTS to the fifth node n5 in response to the fifth gate signal EM2.

The first switch element T1 is turned on in response to the pulse of the first gate signal SC1 generated as the gate-on voltage VGH during the initialization period INI and the sampling period SAMP. When the first switch element T1 is turned on, the initialization voltage Vinit is applied to the second node DTG. The first switch element T1 is turned off during the light emission period EMI. The first switch element T1 includes a first electrode connected to the third constant voltage node PL3 to which the initialization voltage Vinit is applied, a gate electrode connected to the first gate line GL1 to which the first gate signal SC1 is applied, and a second electrode connected to the second node DTG.

The second switch element T2 is turned on in response to the pulse of the second gate signal SC2 generated as the gate-on voltage VGH during the sampling period SAMP. When the second switch element T2 is turned on, the data voltage Vdata is applied to the fourth node n4. The data voltage Vdata is a voltage in which the dynamic voltage DR of the pixel data is added to the initialization voltage Vinit. The second switch element T2 is turned off during the initialization period INI and the light emission period EMI. The second switch element T2 includes a first electrode connected to the data line DL to which the data voltage Vdata is applied, a gate electrode connected to the second gate line GL2 to which the second gate signal SC2 is applied, and a second electrode connected to the fourth node n4.

The third switch element T3 is turned on in response to the pulse of the third gate signal SC3 generated as the gate-on voltage VGH during the initialization period INI. The third switch element T3 is turned off during the sampling period SAMP and the light emission period EMI. When the third switch element T3 is turned on, the reference voltage Vref is applied to the third node DTS. The third switch element T3 includes a first electrode connected to the third node DTS, a gate electrode connected to the third gate line GL3 to which the third gate signal SC3 is applied, and a second electrode connected to the fourth constant voltage node PL4 to which the reference voltage Vref is applied.

The fourth switch element T4 is turned on in response to the fourth gate signal EM1 generated as the gate-on voltage VGH during the sampling period SAMP and the light emission period EMI. When the fourth switch element T4 is turned on, the pixel driving voltage ELVDD is applied to the first node DTD. The fourth switch element T4 is turned off during the initialization period INI. The fourth switch element T4 includes a first electrode connected to the first constant voltage node PL1 to which the pixel driving voltage ELVDD is applied, a gate electrode connected to the fourth gate line GL4 to which the fourth gate signal EM1 is applied, and a second electrode connected to the first node DTD.

The fifth switch element T5 is turned on in response to the gate-on voltage VGH of the fifth gate signal EM2 during the initialization period INI and the light emission period EMI to connect the fourth node n4 to the second node DTG. The fifth switch element T5 is turned off during the sampling period SAMP. The fifth switch element T5 includes a first electrode connected to the fourth node n4, a gate electrode connected to the fifth gate line GL5 to which the fifth gate signal EM2 is applied, and a second electrode connected to the second node DTG.

The sixth switch element T6 is turned on in response to the gate-on voltage VGH of the fifth gate signal EM2 during the initialization period INI and the light emission period EMI to connect the third node DTS to the fifth node n5, for example, the anode electrode of the light emitting element EL. The sixth switch element T6 is turned off during the sampling period SAMP. The sixth switch element T6 includes a first electrode connected to the third node DTS, a gate electrode connected to the fifth gate line GL5, and a second electrode connected to the fifth node n5.

Figure 3A:
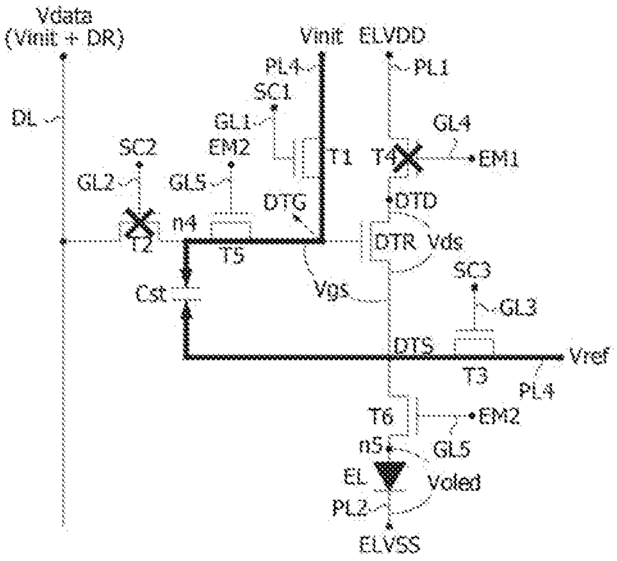
FIGS. 3A to 5B are diagrams illustrating a driving period of the pixel circuit shown in FIG. 1 in stages according to an embodiment of the present disclosure.

FIGS. 3A to 5B are diagrams illustrating a driving period of the pixel circuit shown in FIG. 1 in stages. FIG. 3A is a circuit diagram illustrating a current flowing through the pixel circuit during the initialization period INI. FIG. 4A is a circuit diagram illustrating a current flowing through the pixel circuit during the sampling period SAMP. FIG. 5A is a circuit diagram illustrating a current flowing through the pixel circuit during the light emission period EMI.

Figure 3B:
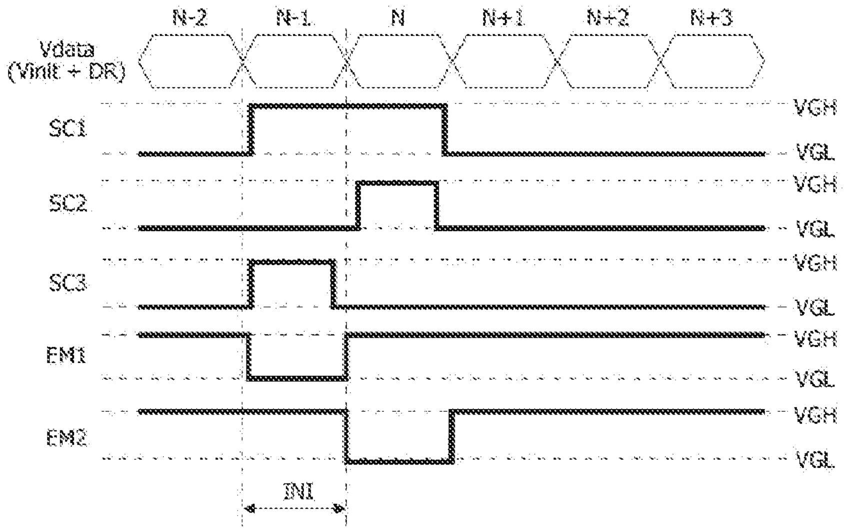

Referring to FIGS. 3A and 3B, during an initialization period INI, the main nodes of the pixel circuit and a capacitor Cst are initialized. During the initialization period INI, a voltage of a first gate signal SC1, a third gate signal SC3, and a fifth gate signal EM2 is the gate-on voltage VGH. During the initialization period INI, a voltage of a second gate signal SC2 and a fourth gate signal EMI is the gate-off voltage VGL. Therefore, during the initialization period INI, the first, third, fifth, and sixth switch elements T1, T3, T5, and T6 are turned on, and the second and fourth switch elements T2 and T4 are turned off. As a result, during the initialization period INI, voltages of the second and fourth nodes DTG and n4 are initialized to the initialization voltage Vinit, and a voltage of the third node DTS is initialized to the reference voltage Vref. Therefore, during the initialization period INI, a voltage of the capacitor Cst is given by Vinit-Vref. During the initialization period INI, the driving element DTR can be turned on. The light emitting element EL is not emitted during the initialization period INI because its anode voltage is a reference voltage Vref that is lower than a threshold voltage of the light emitting element EL.

In a sampling period SAMP, the driving element DTR has to be driven as a source follower with a voltage in which the dynamic voltage DR of the data voltage Vdata and the threshold voltage Vth of the driving element DTR are added. For this purpose, the capacitor Cst is charged with a voltage higher than DR+Vth during the initialization period INI based on the initialization voltage Vinit. Considering the above, the reference voltage Vref is set to Vinit−DR−Vth_Margin. Here, a threshold voltage margin Vth_Margin can be set to approximately, but not limited to, 1 [V].

Figure 4A:
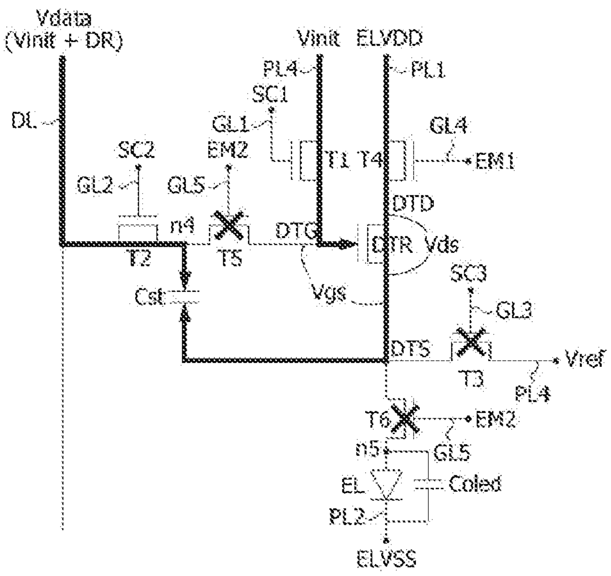
Figure 4B:
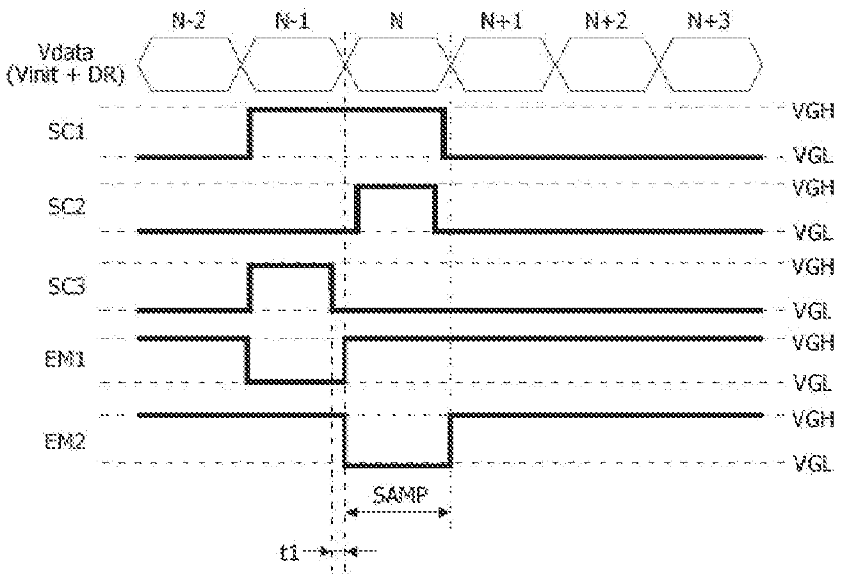

Referring to FIGS. 4A and 4B, during the sampling period SAMP, the threshold voltage Vth of the driving element DTR is sensed and stored in the capacitor Cst, and the data voltage Vdata is stored in the capacitor Cst. During the sampling period SAMP, the voltage of the first gate signal SC1, second gate signal SC2, and fourth gate signal EMI is the gate-on voltage VGH. During the sampling period SAMP, the voltage of the third gate signal SC2 and the fifth gate signal EM2 is the gate-off voltage VGL. Therefore, during the sampling period SAMP, the first, second, and fourth switch elements T1, T2, and T4 are turned on, and the third, fifth, and sixth switch elements T3, T5, and T6 are turned off.

At the end of the sampling period SAMP, the voltage of the fourth node n4 is given by Vdata=Vinit+DR and the voltage of the third node DTS is given by Vinit−Vth, so the voltage of the capacitor Cst is given by DR+Vth. During the sampling period SAMP, the voltage of the second node DTG remains held at the initialization voltage Vinit.

The light emitting element EL includes a capacitor Coled between an anode electrode and a cathode electrode thereof. During the sampling period SAMP, the sixth switch element T6 is turned off to block the capacitor Cst and the capacitor Coled of the light emitting element EL from being connected in parallel. During the sampling period SAMP, in the situation that the fourth and fifth gate signals EM1 and EM2 are simultaneously at the gate-on voltage VGH in the period t1, sections of the gate-on voltages of the fourth and fifth gate signals EM1 and EM2 in the period t1 do not overlap with each other because the capacitor Cst stores the initialization voltage Vinit rather than the threshold voltage Vth of the driving element DT.

Figure 5A:
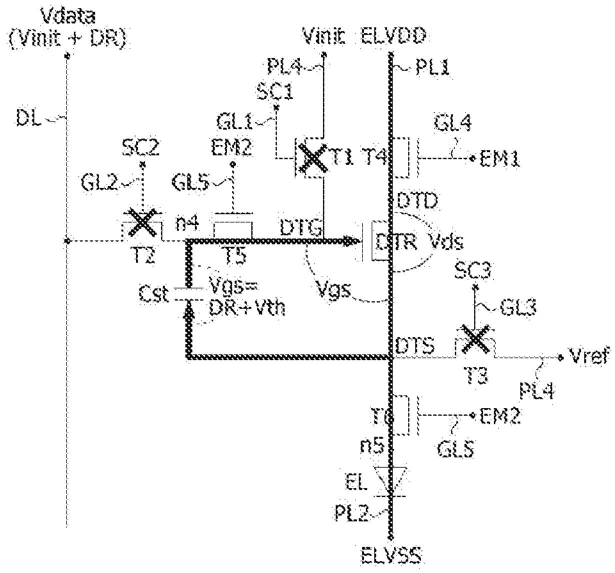
Figure 5B:
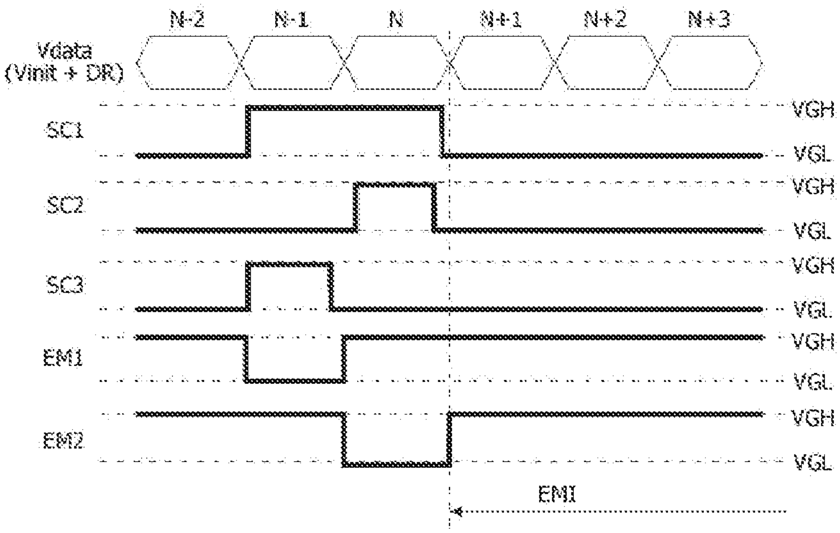

Referring to FIGS. 5A and 5B, during the light emission period EMI, the driving element DTR generates a current according to the gate-source voltage Vgs to drive the light emitting element EL. The light emitting element EL can emit light at a luminance corresponding to a grayscale value of the pixel data by the current flowing through the driving element DTR.

During the light emission period EMI, the voltage of the fourth and fifth gate signals EM1 and EM2 is the gate-on voltage VGH, and the voltage of the other gate signals SC1, SC2, and SC3 is the gate-off voltage VGL. During the light emission period (EMI), the fourth to sixth switch elements T4, T5, and T6 are turned on, and the first to third switch elements T1, T2, and T3 are turned off. During the light emission period EMI, the voltage of the second and fourth nodes DTG and n4 is given by Voled+DR+Vth, and the voltage of the third node DTS is Voled between the anode electrode and the cathode electrode of the light emitting device EL. Therefore, during the light emission period EMI, the voltage Vgs between the capacitor Cst and the gate-source voltage of the driving element DTR is given by Vgs=DR+Vth.

Figure 6:
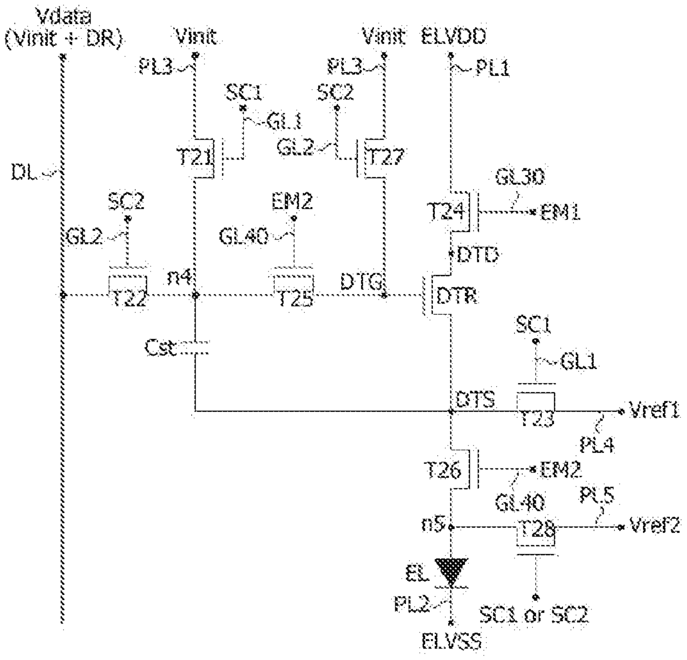
FIG. 6 is a circuit diagram illustrating a pixel circuit according to another embodiment of the present invention.
Figure 7:
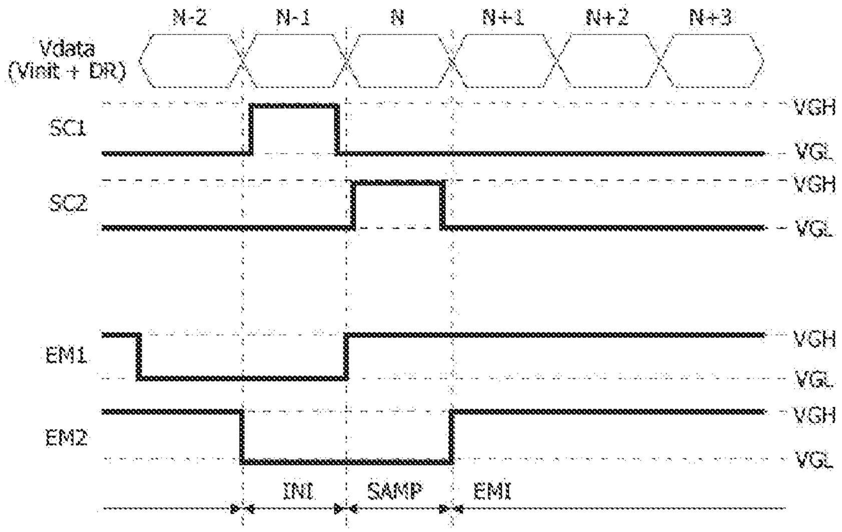
FIG. 7 is a waveform diagram illustrating gate signals applied to the pixel circuit shown in FIG. 6 and voltages of its main nodes according to an embodiment of the present disclosure.

FIG. 6 is a circuit diagram illustrating a pixel circuit according to a second embodiment of the present disclosure. FIG. 7 is a waveform diagram illustrating gate signals applied to the pixel circuit shown in FIG. 6 and voltages of its main nodes. In the second embodiment, substantially the same components as in the first embodiment described above and detailed descriptions thereof are omitted. Also, the pixel circuit of FIG. 6 is similar to the pixel circuit of FIG. 1, except that the pixel circuit of FIG. 6 includes additional transistors for providing two sources of initialization voltage Vinit and two reference voltages Vref1 and Vref2.

Referring to FIGS. 6 and 7, the pixel circuit includes a light emitting element EL, a driving element DTR driving the light emitting element EL, a plurality of switch elements T21 to T28, and a capacitor Cst. The driving element DTR and the switch elements T21 to T28 can be implemented as n-channel oxide TFTs.

The pixel circuit is connected to a data line DL to which a data voltage Vdata is applied, and to gate lines GL1, GL2, GL30 and GL40 to which gate signals SC1, SC2, EM1, and EM2 are applied. The pixel circuit is connected to power nodes to which DC voltages (or constant voltages) are applied, such as a first constant voltage node PL1 to which a pixel driving voltage ELVDD is applied, a second constant voltage node PL2 to which a cathode voltage ELVSS is applied, a third constant voltage node PL3 to which an initialization voltage Vinit is applied, a fourth constant voltage node PL4 to which a first reference voltage Vref1 is applied, and a fifth constant voltage node PL5 to which a second reference voltage Vref2 is applied. On the display panel, the power lines to which the constant voltage nodes are connected can be commonly connected to all of the pixels.

The first reference voltage Vref1 can be set to a voltage satisfying Vref1<Vinit-DR-Vth to secure a potential difference for initializing the capacitor Cst. The second reference voltage Vref2 is a voltage for initializing a voltage Voled of the light emitting element EL. The second reference voltage Vref2 can be set to a voltage satisfying Vref2<ELVSS−Voled_Vth. Here, 'Voled_Vth' is a threshold voltage of the driving element EL. Depending on the structure of the light emitting element EL, the threshold voltage Voled_Vth of the light emitting element EL can vary. The first reference voltage Vref1 and the second reference voltage Vref2 can be set to the same voltage or set to different voltages according to the threshold voltage Vth of the driving element DT and the threshold voltage Voled_Vth of the light emitting element EL.

A driving period of the pixel circuit includes an initialization period INI, a sampling period SAMP, and an emission period EMI determined by the waveforms of the gate signals SC1, SC2, EM1, and EM2, as shown in FIG. 7. The driving period of the pixel circuit is adjustable by waveforms of the gate signals SC1, SC2, EM1, and EM2. After the pixel circuit is initialized in the initialization period INI, the threshold voltage Vth of the driving element DTR and the data voltage Vdata are stored in the capacitor Cst of the pixel circuit during the sampling period SAMP. During the light emission period EMI, the driving element DTR generates a current according to the gate-source voltage Vgs, and the emitting element EL can be driven and light can be emitted according to the current from the driving element DTR.

A voltage of the first gate signal SC1 is generated as a pulse of the gate-on voltage VGH during the initialization period INI, and is the gate-off voltage VGL during the sampling period SAMP and the light emission period EMI. A voltage of the second gate signal SC2 is generated as a pulse of the gate-on voltage VGH synchronized with the data voltage Vdata during the sampling period SAMP, and the gate-off voltage VGL during the initialization period INI and the light emission period EMI.

A voltage of the third gate signal EM1 is the gate-on voltage VGH during the sampling period SAMP and the light emission period EMI, and is generated as a pulse of the gate-off voltage VGL during the initialization period INI. A voltage of the fourth gate signal EM2 is the gate-on voltage VGH during the light emission period EMI, and is generated as a pulse of the gate-off voltage VGL during the initialization period INI and the sampling period SAMP. The pulses of the third gate signal EM1 and the fourth gate signal EM2 have the same pulse width of two horizontal periods (2H) and can overlap with each other by one horizontal period (1H). In this situation, the pulses of the third and fourth gate signals EM1 and EM2 can be generated by using a single shift register. In the example of FIG. 7, the pulse of the third gate signal EM1 is the gate-off voltage VGL during (N−2)th and (N−1)th horizontal periods, and the pulse of the fourth gate signal EM2 is the gate-off voltage VGL during the (N−1)th and Nth horizontal periods. In FIG. 7, the initialization period INI is the (N−1)th horizontal period N−1, and the sampling period SAMP is the Nth horizontal period N. And, the light emission period EMI is the (N+1)th to the (N+3)th horizontal periods (N+1 to N+3).

The driving element DTR includes a first electrode connected to a first node DTD, a gate electrode connected to a second node DTG, and a second electrode connected to a third node DTS. An anode electrode of the light emitting element EL is connected to a fifth node n5, and a cathode electrode is connected to a second constant voltage node PL2 to which the cathode voltage ELVSS is applied. The capacitor Cst is connected between the third node DTS and the fourth node n4.

The switch elements T21 to T28 of the pixel circuit include a first switch element T21 that supplies the initialization voltage Vinit to the fourth node n4 in response to the first gate signal SC1, and a second switch element T22 that supplies the data voltage Vdata to the fourth node n4 in response to the second gate signal SC2, a third switch element T23 that supplies the first reference voltage Vref1 to the third node DTS in response to the first gate signal SC1, a fourth switch element T24 that supplies the pixel driving voltage ELVDD to the first node DTD in response to the fourth gate signal EMI, a fifth switch element T25 that connects the fourth node n4 to the second node DTG in response to the fourth gate signal EM2, a sixth switch element T26 that connects the third node DTS to the fifth node n5 in response to the fourth gate signal EM2, a seventh switch element T27 that supplies the initialization voltage Vinit to the second node DTG in response to the second gate signal SC2, and an eighth switch element T28 that supplies the second reference voltage Vref2 to the fifth node n5 in response to the first gate signal SC1 or the second gate signal SC2.

The first switch element T21 is turned on in response to a pulse of the first gate signal SC1 generated as the gate-on voltage VGH during the initialization period INI. When the first switch element T21 is turned on, the initialization voltage Vinit is applied to the fourth node n4. The first switch element T21 is turned off during the sampling period SAMP and the light emission period EMI. The first switch element T21 includes a first electrode connected to the third constant voltage node PL3 to which the initialization voltage Vinit is applied, a gate electrode connected to the first gate line GL1 to which the first gate signal SC1 is applied, and a second electrode connected to the fourth node n4.

The second switch element T22 is turned on in response to the pulse of the second gate signal SC2 generated as the gate-on voltage VGH during the sampling period SAMP. When the second switch element T22 is turned on, the data voltage Vdata is applied to the fourth node n4. The data voltage Vdata is a voltage in which the dynamic voltage DR of the pixel data is added to the initialization voltage Vinit. The second switch element T22 is turned off during the initialization period INI and the light emission period EMI. The second switch element T22 includes a first electrode connected to the data line DL to which the data voltage Vdata is applied, a gate electrode connected to the second gate line GL2 to which the second gate signal SC2 is applied, and a second electrode connected to the fourth node n4.

The third switch element T23 is turned on in response to a pulse of the first gate signal SC1 generated as the gate-on voltage VGH during the initialization period INI. The third switch element T23 is turned off during the sampling period SAMP and the light emission period EMI. When the third switch element T23 is turned on, the first reference voltage Vref1 is applied to the third node DTS. The third switch element T23 includes a first electrode connected to the third node DTS, a gate electrode connected to the first gate line GL1 to which the first gate signal SC1 is applied, and a second electrode connected to the fourth constant voltage node PL4 to which the first reference voltage Vref1 is applied.

The fourth switch element T24 is turned on in response to the third gate signal EM1 generated as the gate-on voltage VGH during the sampling period SAMP and then emission period EMI. When the fourth switch element T24 is turned on, the pixel driving voltage ELVDD is applied to the first node DTD. The fourth switch element T24 is turned off during the initialization period INI. The fourth switch element T24 includes a first electrode connected to the first constant voltage node PL1 to which the pixel driving voltage ELVDD is applied, a gate electrode connected to the third gate line GL30 to which the third gate signal EM1 is applied, and a second electrode connected to the first node DTD.

The fifth switch element T25 is turned on in response to the gate-on voltage VGH of the fourth gate signal EM2 during the light emission period EMI to connect the fourth node n4 to the second node DTG. The fifth switch element T25 is turned off during the initialization period INI and the sampling period SAMP. The fifth switch element T25 includes a first electrode connected to the fourth node n4, a gate electrode connected to the fourth gate line GL40 to which the fourth gate signal EM2 is applied, and a second electrode connected to the second node DTG.

The sixth switch element T26 is turned on in response to the gate-on voltage VGH of the fourth gate signal EM2 during the light emission period EMI to connect the third node DTS to the fifth node n5. The sixth switch element T26 is turned off during the initialization period INI and the sampling period SAMP. The sixth switch element T26 includes a first electrode connected to the third node DTS, a gate electrode connected to the fourth gate line GL40, and a second electrode connected to the fifth node n5.

The seventh switch element T27 is turned on in response to the pulse of the second gate signal SC2 generated as the gate-on voltage VGH during the sampling period SAMP. When the seventh switch element T27 is turned on, the initialization voltage Vinit is applied to the second node DTG. The seventh switch element T27 is turned off during the initialization period INI and the light emission period EMI. The seventh switch element T27 includes a first electrode connected to the third constant voltage node PL3 to which the initialization voltage Vinit is applied, a gate electrode connected to the second gate line GL2 to which the second gate signal SC2 is applied, and a second electrode connected to the second node DTG.

The eighth switch element T28 is turned on during the initialization period INI or the sampling period SAMP in response to the pulse of the first gate signal SC1 or the second gate signal SC2. When the eighth switch element T28 is turned on, the second reference voltage Vref2 is applied to the fifth node n5. The eighth switch element T28 includes a first electrode connected to the fifth node n5, a gate electrode connected to the first gate line GL1 or the second gate line GL2, and a second electrode connected to the fifth constant voltage node PL5 to which the second reference voltage Vref2 is applied.

Figure 8A:
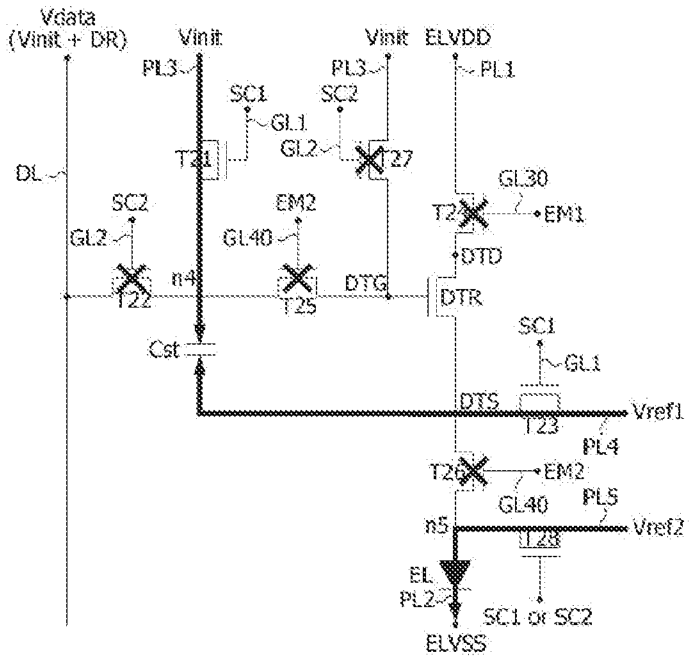
FIGS. 8A to 10B are diagrams illustrating a driving period of the pixel circuit shown in FIG. 6 in stages according to an embodiment of the present disclosure.

FIGS. 8A to 10B are diagrams illustrating a driving period of the pixel circuit shown in FIG. 6 in stages. FIG. 8A is a circuit diagram illustrating a current flowing through the pixel circuit during the initialization period INI. FIG. 9A is a circuit diagram illustrating a current flowing through the pixel circuit during the sampling period SAMP. FIG. 10A is a circuit diagram illustrating a current flowing through the pixel circuit during the light emission period EMI.

Figure 8B:
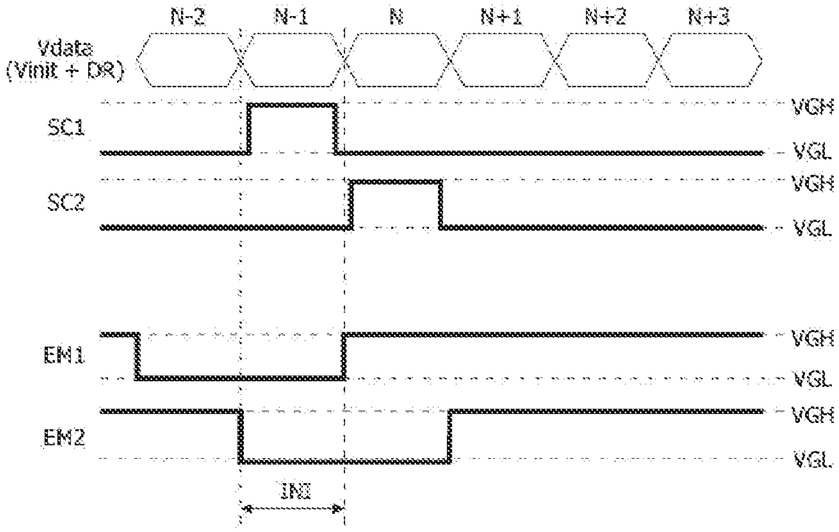

Referring to FIGS. 8A and 8B, during the initialization period INI, the main nodes of the pixel circuit and the capacitor Cst are initialized. During the initialization period INI, the voltage of the first gate signal SC1 is the gate-on voltage VGH. During the initialization period INI, the voltage of the second through fourth gate signals SC2, EM1, and EM2 is the gate-off voltage VGL. Therefore, during the initialization period INI, the first, third, and eighth switch elements T21, T23, and T28 are turned on, and the other switch elements T22 and T24 to T27 are turned off. As a result, during the initialization period INI, the voltage of the fourth node n4 can be initialized to the initialization voltage Vinit, the voltage of the third node DTS can be initialized to the first reference voltage Vref1, and the voltage of the fifth node n5 can be initialized to the second reference voltage Vref2. Therefore, the voltage of the capacitor Cst is given by Vinit-Vref1 in the initialization period INI. During the initialization period INI, the driving element DTR can be turned on. The light emitting element EL does not emit light during the initialization period INI.

Figure 9A:
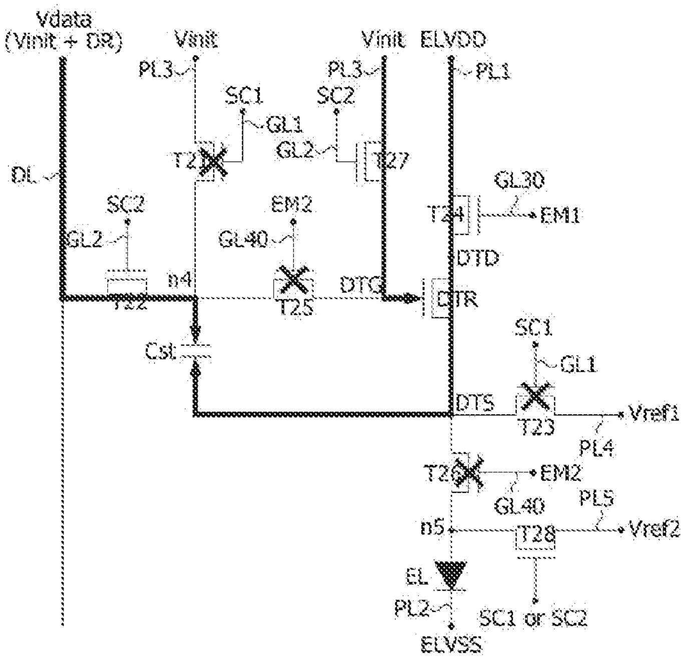
Figure 9B:
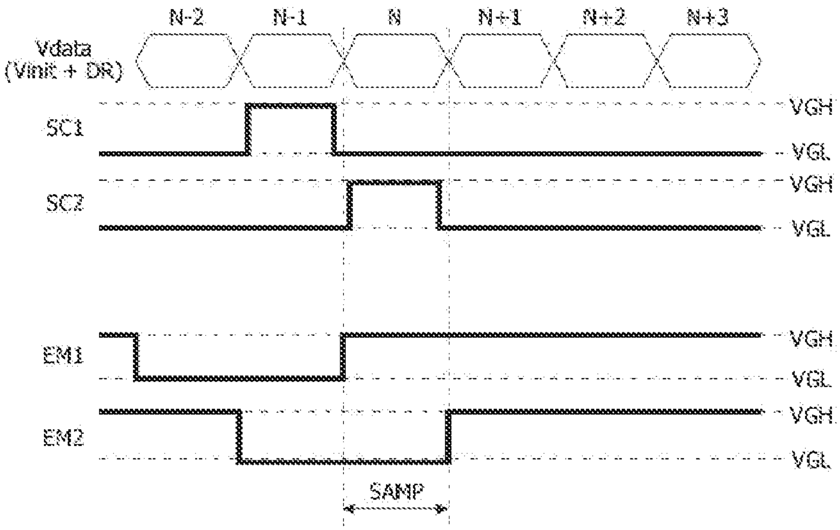

Referring to FIGS. 9A and 9B, during the sampling period SAMP, the threshold voltage Vth of the driving element DTR is sensed and stored in the capacitor Cst, and the data voltage Vdata is stored in the capacitor Cst. During the sampling period SAMP, the voltage of the second gate signal SC2 and the third gate signal EM1 is the gate-on voltage VGH. During the sampling period SAMP, the voltage of the first and fourth gate signals SC1 and EM2 is the gate-off voltage VGL. Therefore, during the sampling period SAMP, the second, fourth, and seventh switch elements T22, T24, and T27 are turned on, and the other switch elements T21, T23, T25, T26, and T28 are turned off. At the end of the sampling period SAMP, the voltage of the capacitor Cst is given by DR+Vth. During the sampling period SAMP, the second reference voltage Vref2 can be applied to the fifth node n5 via the eighth switch element T28.

Figure 10A:
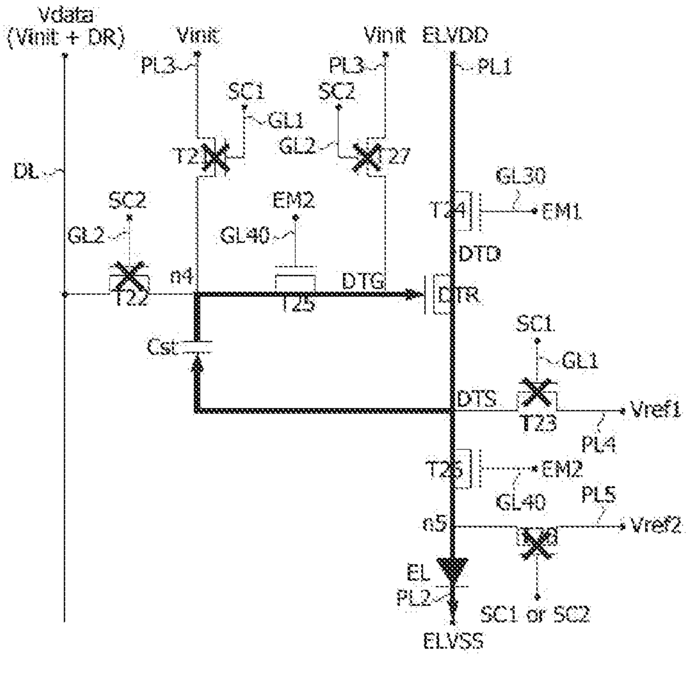
Figure 10B:
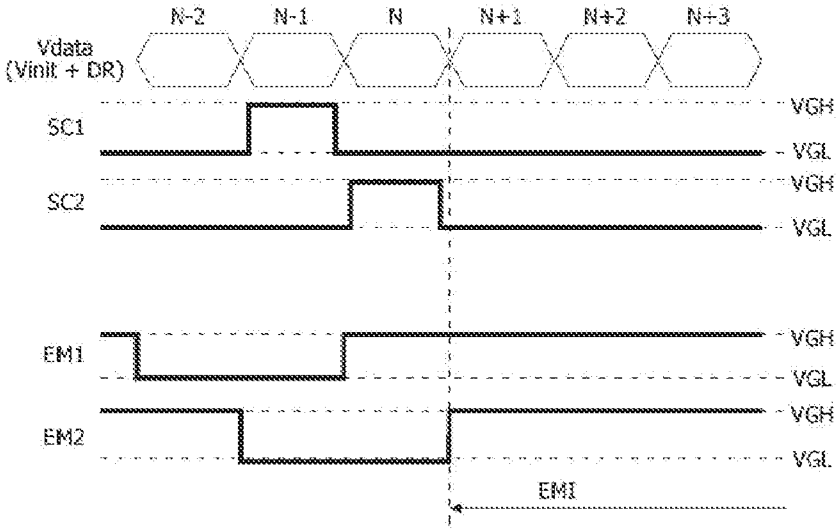

Referring to FIGS. 10A and 10B, during the light emission period EMI, the driving element DTR generates a current according to the gate-source voltage (Vgs=DR+Vth) to drive the light emitting element EL. The light emitting element EL can emit light at a luminance corresponding to a grayscale value of the pixel data by the current flowing through the driving element DTR.

During the light emission period EMI, the voltage of the third and fourth gate signals EM1 and EM2 is the gate-on voltage VGH, and the voltage of the other gate signals SC1 and SC2 is the gate-off voltage VGL. During the light emission period EMI, the fourth to sixth switch elements T24, T25, and T26 are turned on, and the other switch elements T21, T22, T23, T27, and T28 are turned off.

Figure 11:
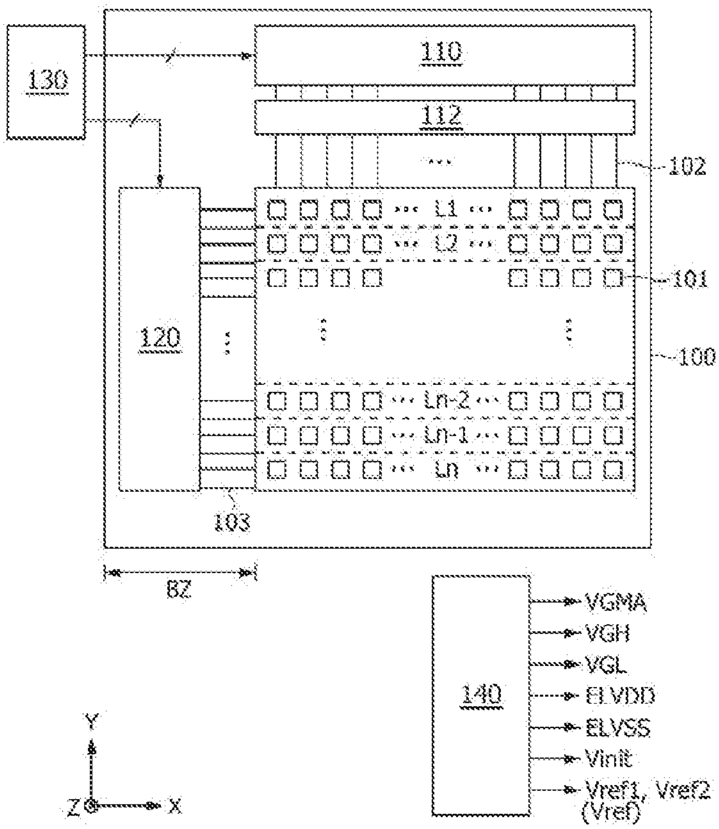
FIG. 11 is a block diagram illustrating a display device according to an embodiment of the present disclosure.
Figure 12:
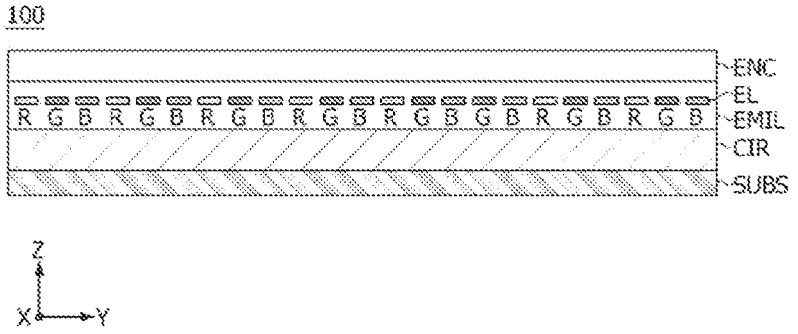
FIG. 12 is a cross-sectional view illustrating a cross-sectional structure of the display panel shown in FIG. 11 according to an embodiment of the present disclosure.

FIG. 11 is a block diagram illustrating a display device according to one embodiment of the present disclosure; and FIG. 12 is a cross-sectional view illustrating a cross-sectional structure of the display panel shown in FIG. 11.

Referring to FIGS. 11 and 12, the display device according to an embodiment of the present disclosure includes a display panel 100, a display panel driving circuit for writing pixel data to pixels of the display panel 100, and a power supply 140 for generating power for driving the pixels and the display panel driving circuit.

The display panel 100 can be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 intersected with the data lines 102, and pixels arranged in a matrix form. The display panel 100 can further include power lines commonly connected to the pixels. The power lines are connected to constant voltage nodes of the pixel circuits and supply a constant voltage necessary for driving the pixels 101 to the pixels 101.

Each of the pixels 101 can be divided into a red sub-pixel, a green sub-pixel, and a blue sub-pixel for color implementation. Each of the pixels can further include a white sub-pixel. Each of the sub-pixels can be implemented with any of the pixel circuits described above. Each of the pixel circuits is connected to the data lines, the gate lines, and the power lines.

The pixels can be arranged as real color pixels and pentile pixels. A pentile pixel can realize a higher resolution than the real color pixel by driving two sub-pixels having different colors as one pixel 101 through the use of a preset pixel rendering algorithm. The pixel rendering algorithm can compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 can be implemented with a non-transmissive display panel or a transmissive display panel. The transmissive display panel can be applied to a transparent display device in which an image is displayed on a screen and an actual object in the background is visible. The display panel 100 can be manufactured as a flexible display panel.

The cross-sectional structure of the display panel 100 can include a circuit layer CIR, a light emitting element layer EMIL, and an encapsulation layer ENC that are stacked on a substrate SUBS, as shown in FIG. 12.

The circuit layer CIR can include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR can be implemented as an n-channel oxide TFT.

The light emitting element layer EMIL can include a light emitting element EL driven by the pixel circuit. The light emitting element EL can include a light emitting element of a red sub-pixel, a light emitting element of a green sub-pixel, and a light emitting element of a blue sub-pixel. The light emitting element layer EMIL can further include a light emitting element of white sub-pixel. The light emitting element layer EMIL in each of the sub-pixels can have a structure in which the light emitting element and a color filter are stacked. The light emitting elements EL in the light emitting element layer EMIL can be covered by multiple protective layers including an organic film and an inorganic film.

The encapsulation layer ENC covers the light emitting element layer EMIL to seal the circuit layer CIR and the light emitting element layer EMIL. The encapsulation layer ENC can also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL can be effectively blocked.

A touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. The touch sensor layer can include metal wiring patterns and insulating films forming the capacitance of the touch sensors. The insulating films can insulate a portion where the metal wiring patterns are intersected, and can planarize the surface of the touch sensor layer. The polarizing plate can improve visibility and contrast ratio by converting the polarization of external light reflected by metal of the touch sensor layer and the circuit layer. The polarizing plate can be implemented as a polarizer or a circular polarizer to which a linear polarizer and a phase retardation film are bonded. A cover glass can be adhered to the polarizing plate. The color filter layer can include red, green, and blue color filters. The color filter layer can further include a black matrix pattern. The color filter layer can replace the polarizing plate by absorbing a part of the wavelength of light reflected from the circuit layer and the touch sensor layer, and increase the color purity of an image reproduced in the pixel array.

The power supply 140 generates DC voltages (or constant voltages) for driving the pixel array of the display panel 100 and the display panel driving circuit by using a DC-DC converter. The DC-DC converter can include a charge pump, a regulator, a buck converter, a boost converter, and the like. The power supply 140 can generate constant voltages such as a gamma reference voltage VGMA, a gate-on voltage VGH, a gate-off voltage VGL, a pixel driving voltage ELVDD, a low potential cathode voltage ELVSS, an initialization voltage Vinit, reference voltages Vref, Vref1 and Vref2, an anode reset voltage Var, and the like by adjusting the level of the DC input voltage applied from a host system. The gamma reference voltage VGMA is supplied to the data drive 110. The gate-on voltage VGH and the gate-off voltage VGL are supplied to the gate driver 120. Constant voltages such as the pixel driving voltage ELVDD, the cathode voltage ELVSS, the initialization Vinit, and the reference voltages Vref, Vref1, and Vref2 are supplied to the pixels 101 via the power lines commonly connected to the pixels 101.

The display panel driving circuit writes pixel data of an input image to the pixels of the display panel 100 under the control of the timing controller 130.

The display panel driving circuit includes the data driver 110 and the gate driver 120. The display panel driving circuit can further include a de-multiplexer array 112 disposed between the data driver 110 and the data lines 102.

The de-multiplexer array 112 sequentially supplies the data voltages output from channels of the data driver 110 to the data lines 102 using a plurality of de-multiplexers DEMUX. A de-multiplexer can include a multiple of switch elements disposed on the display panel 100. When the de-multiplexer is disposed between the output terminals of the data driver 110 and the data lines 102, the number of channels of the data driver 110 can be reduced. The de-multiplexer array 112 can be omitted.

The display panel driving circuit can further include a touch sensor driver for driving touch sensors. The data driver 110 and the touch sensor driver can be integrated into one drive IC (Integrated Circuit). In mobile devices or wearable devices, the timing controller 130, the power supply 140, the data driver 110, and the like can be integrated into one drive IC.

The display panel driving circuit can operate in a low-speed driving mode under the control of the timing controller 130. The low-speed driving mode can be set to reduce power consumption of the display device when an input image does not change during a predetermined number of frames as a result of analyzing the input image (e.g., when a static image is displayed for a predetermined amount of time). In the low-speed driving mode, the power consumption in the display panel driving circuit and the display panel 100 can be reduced by lowering a frame frequency at which the pixel data is written to the pixels, for example, a refresh rate, when still images are displayed for a predetermined amount of time or longer. The low-speed driving mode is not limited to a situation where a still image is displayed. For example, when the display device operates in a standby mode or when a user command or an input image is not input to the display panel driving circuit for a predetermined amount of time or longer, the display panel driving circuit can operate in the low-speed driving mode.

The data driver 110 receives pixel data of the input image received as a digital signal from the timing controller 130 and outputs a data voltage. The data driver 110 converts the pixel data of the input image into a gamma compensated voltage at each frame period in a normal driving mode using a digital-to-analogue converter (DAC) and outputs the data voltage VDATA. The data driver 110 converts the pixel data of the input image into the gamma compensated voltage to output the data voltage VDATA using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensated voltage for each gray scale. The gamma compensated voltage for each gray scale is provided to the DAC in the data driver 110. The data voltage VDATA is output through an output buffer in each of the channels of the data driver 110.

The gate driver 120 can be implemented as a gate in panel (GIP) circuit formed in the circuit layer CIR on the display panel 100 together with the TFT array of the pixel array and wirings. The gate driver 120 can be disposed on a bezel area BZ, which is non-display area of the display panel 100, or can be distributedly disposed in a pixel array in which an input image is reproduced.

The gate driver 120 can be disposed in the bezel area BZ on both sides of the display panel 100 with the display area of the display panel interposed therebetween and can supply gate pulses from the both sides of the gate lines 103 in a double feeding method. The gate driver 120 sequentially outputs pulses of the gate signals to the gate lines 103 under the control of the timing controller 130. The gate driver 120 can sequentially supply the gate signals SC1, SC2, SC3, EM1, and EM2 to the gate lines 103 by shifting the gate signals using a plurality of shift registers.

The timing controller 130 receives the digital video data DATA of the input image and timing signals synchronized therewith from the host system. The timing signal can include a vertical synchronization signal Vsync, a horizontal synchronization signal Hsync, a clock CLK, and a data enable signal DE. Because a vertical period and a horizontal period can be known by counting the data enable signal DE, the vertical synchronization signal Vsync and the horizontal synchronization signal Hsync can be omitted. The data enable signal DE has a cycle of one horizontal period (1H).

The host system can be one of a television (TV) system, a tablet computer, a notebook computer, a navigation system, a personal computer (PC), a home theater system, a mobile device, a wearable device, and a vehicle system. The host system can scale an image signal from a video source to match the resolution of the display panel 100 and transmit it to the timing controller 130 together with the timing signal.

The timing controller 130 can multiply the input frame frequency by i (where i is a natural number) in a normal driving mode, so that it can control the operation timing of the display panel driving circuit at a frame frequency of the input frame frequency×i Hz. The input frame frequency is 60 Hz in a national television standards committee (NTSC) system and 50 Hz in a phase-alternating line (PAL) system.

The host system or timing controller 130 can vary the frame frequency to match the movement or the content characteristics of the input image.

The timing controller 130 reduces a frequency of a frame rate at which the pixel data is written to the pixels in the low-speed driving mode, compared to the normal driving mode. For example, a frame frequency at which pixel data is written to pixels in the normal driving mode can occur at a refresh rate of 60 Hz or higher, e.g., any one of 60 Hz, 120 Hz, 144 Hz or 240 Hz, and the frame frequency in the low-speed driving mode can be set at a frequency lower than that in the normal driving mode. The timing controller 130 can reduce the driving frequency for the display panel driving circuit by reducing the frame frequency to lower the refresh rate of the pixels in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 synchronizes the data driver 110, the de-multiplexer array 112, the touch sensor driver, and the gate driver 120 by controlling the operation timings of the display panel driving circuit.

The gate timing control signal generated from the timing controller 130 can be input to the shift register of the gate driver 120 through a level shifter. The level shifter can receive the gate timing control signal and generate a start pulse and a shift clock to provide them to the shift registers of the gate driver 120.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode connected to a first node, a gate electrode connected to a second node, and a second electrode connected to a third node;

a first switch element configured to supply an initialization voltage to the second node in response to a first gate signal;

a second switch element configured to supply a data voltage to a fourth node in response to a second gate signal;

a capacitor connected between the third node and the fourth node;

a third switch element configured to supply a reference voltage to the third node in response to a third gate signal;

a fourth switch element configured to supply a pixel driving voltage to the first node in response to a fourth gate signal;

a fifth switch element configured to electrically connect the fourth node with the second node in response to a fifth gate signal;

a light emitting element configured to emit light based on a current supplied through the driving element, the light emitting element including an anode electrode connected to a fifth node and a cathode electrode configured to receive a cathode voltage that is lower than the pixel driving voltage; and a sixth switch element configured to electrically connect the third node with the fifth node in response to the fifth gate signal.

2. The pixel circuit of claim 1, wherein the driving element and the first through sixth switch elements are n-channel oxide transistors.

3. The pixel circuit of claim 1, wherein the second node is connected among an electrode of the fifth switch element, an electrode of the first switch element and the gate electrode of the driving element.

4. The pixel circuit of claim 1, wherein the second switch element and the fifth switch element are connected in series, and wherein a first capacitor electrode of the capacitor is connected to the fourth node located between the second switch element and the fifth switch element, and a second capacitor electrode of the capacitor is connected to the third node located between the driving element and the sixth switch element.

5. The pixel circuit of claim 1, wherein the data voltage is a sum of the initialization voltage and a dynamic voltage, and wherein the dynamic voltage varies based on a grayscale value of pixel data.

6. The pixel circuit of claim 1, wherein a driving period of the pixel circuit includes:

an initialization period during which the pixel circuit is initialized;

a sampling period during which a threshold voltage of the driving element and the data voltage are stored in the capacitor; and a light emission period during which the light emitting element is driven to emit light, wherein a voltage of the first gate signal is a gate-on voltage during both of the initialization period and the sampling period, and a gate-off voltage during the light emission period;

wherein a voltage of the second gate signal is the gate-on voltage that is synchronized with the data voltage during the sampling period, and the voltage of the second gate signal is the gate-off voltage during both of the initialization period and the light emission period;

wherein a voltage of the third gate signal is the gate-on voltage during the initialization period, and the voltage of the third gate signal is the gate-off voltage during both of the sampling period and the light emission period;

wherein a voltage of the fourth gate signal is the gate-on voltage during both of the sampling period and the light emission period, and the voltage of the fourth gate signal is the gate-off voltage during the initialization period;

wherein a voltage of the fifth gate signal is the gate-on voltage during both of the initialization period and the light emission period, and the voltage of the fifth gate signal is generated as a pulse of the gate-off voltage during the sampling period; and wherein each of the first through sixth switch elements is configured to turn on in response to the gate-on voltage and turn off in response to the gate-off voltage.

7. The display device of claim 1, wherein the first switch element includes a first electrode configured to receive the initialization voltage, a gate electrode configured to receive the first gate signal, and a second electrode connected to the second node;

wherein the second switch element includes a first electrode configured to receive the data voltage, a gate electrode configured to receive the second gate signal, and a second electrode connected to the fourth node;

wherein the third switch element includes a first electrode connected to the third node, a gate electrode configured to receive the third gate signal, and a second electrode configured to receive the reference voltage;

wherein the fourth switch element includes a first electrode configured to receive the pixel driving voltage, a gate electrode configured to receive the fourth gate signal, and a second electrode connected to the first node;

wherein the fifth switch element includes a first electrode connected to the fourth node, a gate electrode configured to receive the fifth gate signal, and a second electrode connected to the second node; and wherein the sixth switch element includes a first electrode connected to the third node, a gate electrode configured to receive the fifth gate signal, and a second electrode connected to the fifth node.

8. A pixel circuit comprising:

a driving element including a first electrode connected to a first node, a gate electrode connected to a second node, and a second electrode connected to a third node;

a first switch element configured to supply an initialization voltage to a fourth node in response to a first gate signal;

a second switch element configured to supply a data voltage to the fourth node in response to a second gate signal;

a capacitor connected between the third node and the fourth node;

a third switch element configured to supply a first reference voltage to the third node in response to the first gate signal;

a fourth switch element configured to supply a pixel driving voltage to the first node in response to a third gate signal;

a fifth switch element configured to electrically connect the fourth node with the second node in response to a fourth gate signal;

a light emitting element configured to emit light based on a current supplied through the driving element, the light emitting element including an anode electrode connected to a fifth node and a cathode electrode configured to receive a cathode voltage that is lower than the pixel driving voltage; and a sixth switch element configured to electrically connect the third node with the fifth node in response to the fourth gate signal.

9. The pixel circuit of claim 8, wherein the fourth node is connected among an electrode of the first switch element, an electrode of the second switch element, an electrode of the fifth switch element and a first capacitor electrode of the capacitor.

10. The pixel circuit of claim 8, wherein the data voltage is a sum of the initialization voltage and a dynamic voltage, and wherein the dynamic voltage varies based on a grayscale value of pixel data.

11. The pixel circuit of claim 8, further comprising:

a seventh switch element configured to supply the initialization voltage to the second node in response to the second gate signal.

12. The pixel circuit of claim 11, further comprising:

an eighth switch element configured to supply a second reference voltage to the fifth node in response to the first gate signal or the second gate signal.

13. The pixel circuit of claim 12, wherein a driving period of the pixel circuit includes:

an initialization period during which the pixel circuit is initialized;

a sampling period during which a threshold voltage of the driving element and the data voltage are stored in the capacitor; and a light emission period during which the light emitting element emits light, wherein a voltage of the first gate signal is a gate-on voltage during the initialization period, and the voltage of the first gate signal is a gate-off voltage during both of the sampling period and the light emission period;

wherein a voltage of the second gate signal is the gate-on voltage synchronized with the data voltage during the sampling period, and the voltage of the second gate signal is the gate-off voltage during both of the initialization period and the light emission period;

wherein a voltage of the third gate signal is the gate-on voltage during both of the sampling period and the light emission period, and the voltage of the third gate signal is the gate-off voltage during the initialization period; and wherein a voltage of the fourth gate signal is the gate-on voltage during the light emission period, and the voltage of the fourth gate signal is the gate-off voltage during both of the initialization period and the sampling period; and wherein each of the first through eight switch elements is configured to turn on in response to the gate-on voltage and turn off in response to the gate-off voltage.

14. The pixel circuit of claim 13, wherein the first switch element includes a first electrode configured to receive the initialization voltage, a gate electrode configured to receive the first gate signal, and a second electrode connected to the fourth node;

wherein the second switch element includes a first electrode configured to receive the data voltage, a gate electrode configured to receive the second gate signal, and a second electrode connected to the fourth node;

wherein the third switch element includes a first electrode connected to the third node, a gate electrode configured to receive the first gate signal, and a second electrode configured to receive the first reference voltage;

wherein the fourth switch element includes a first electrode configured to receive the pixel driving voltage, a gate electrode configured to receive the third gate signal, and a second electrode connected to the first node;

wherein the fifth switch element includes a first electrode connected to the fourth node, a gate electrode configured to receive the fourth gate signal, and a second electrode connected to the second node;

wherein the sixth switch element includes a first electrode connected to the third node, a gate electrode configured to receive the fourth gate signal, and a second electrode connected to the fifth node;

wherein the seventh switch element includes a first electrode configured to receive the initialization voltage, a gate electrode configured to receive the second gate signal, and a second electrode connected to the second node; and wherein the eighth switch element includes a first electrode connected to the fifth node, a gate electrode configured to receive the first gate signal or the second gate signal, and a second electrode configured to receive the second reference voltage.

15. A display device comprising:

a display panel including a plurality of data lines, a plurality of gate lines, a plurality of power lines, and a plurality of pixel circuits;

a data driver configured to output a data voltage of pixel data to the plurality of data lines; and a gate driver configured to sequentially supply gate signals to the plurality of gate lines, wherein each of the plurality of pixel circuits includes:

a driving element including a first electrode connected to a first node, a gate electrode connected to a second node, and a second electrode connected to a third node;

a first switch element configured to supply an initialization voltage to the second node in response to a first gate signal;

a second switch element configured to supply a data voltage to a fourth node in response to a second gate signal;

a capacitor connected between the third node and the fourth node;

a third switch element configured to supply a reference voltage to the third node in response to a third gate signal;

a fourth switch element configured to supply a pixel driving voltage to the first node in response to a fourth gate signal;

a fifth switch element configured to electrically connect the fourth node with the second node in response to a fifth gate signal;

a light emitting element configured to emit light based on a current supplied through the driving element, the light emitting element including an anode electrode connected to a fifth node and a cathode electrode configured to receive a cathode voltage that is lower than the pixel driving voltage; and a sixth switch element configured to electrically connect the third node with the fifth node in response to the fifth gate signal.

16. The display device of claim 15, wherein the data voltage is a sum of the initialization voltage and a dynamic voltage, and wherein the dynamic voltage varies based on a grayscale value of pixel data.

17. The display device of claim 15, wherein a driving period of each pixel circuit among the plurality of pixel circuit includes:

an initialization period during which the pixel circuit is initialized;

a sampling period during which a threshold voltage of the driving element and the data voltage are stored in the capacitor; and a light emission period during which the light emitting element emits light, wherein a voltage of the first gate signal is a gate-on voltage during both of the initialization period and the sampling period, and the voltage of the first gate signal a gate-off voltage during the light emission period;

wherein a voltage of the second gate signal is the gate-on voltage synchronized with the data voltage during the sampling period, and the voltage of the second gate signal is the gate-off voltage during both of the initialization period and the light emission period;

wherein a voltage of the third gate signal is the gate-on voltage during the initialization period, and the voltage of the third gate signal is the gate-off voltage during both of the sampling period and the light emission period;

wherein a voltage of the fourth gate signal is the gate-on voltage during both of the sampling period and the light emission period, and the voltage of the fourth gate signal is the gate-off voltage during the initialization period;

wherein a voltage of the fifth gate signal is the gate-on voltage during the initialization period and the light emission period, and the voltage of the fifth gate signal is the gate-off voltage during the sampling period; and wherein each of the first through sixth switch elements is configured to turn on in response to the gate-on voltage and turn off in response to the gate-off voltage.

18. A display device comprising:

a display panel including a plurality of data lines, a plurality of gate lines, a plurality of power lines, and a plurality of pixel circuits;

a data driver configured to output a data voltage of pixel data to the plurality of data lines; and a gate driver configured to sequentially supply gate signals to the plurality of gate lines, wherein each of the plurality of pixel circuits includes:

a driving element including a first electrode connected to a first node, a gate electrode connected to a second node, and a second electrode connected to a third node;

a first switch element configured to supply an initialization voltage to a fourth node in response to a first gate signal;

a second switch element configured to supply a data voltage to the fourth node in response to a second gate signal;

a capacitor connected between the third node and the fourth node;

a third switch element configured to supply a first reference voltage to the third node in response to the first gate signal;

a fourth switch element configured to supply a pixel driving voltage to the first node in response to a third gate signal;

a fifth switch element configured to electrically connect the fourth node with the second node in response to a fourth gate signal;

a light emitting element configured to emit light based a current supplied through the driving element, the light emitting element including an anode electrode connected to a fifth node and a cathode electrode configured to receive a cathode voltage that is lower than the pixel driving voltage; and a sixth switch element configured to electrically connect the third node with the fifth node in response to the fourth gate signal.

19. The display device of claim 18, wherein the data voltage is a sum of the initialization voltage and a dynamic voltage; and wherein the dynamic voltage varies based on a grayscale value of pixel data.

20. The display device of claim 18, wherein each of the plurality of pixel circuits further includes:

a seventh switch element configured to apply the initialization voltage to the second node in response to the second gate signal; and an eighth switch element configured to apply a second reference voltage to the fifth node in response to the first gate signal or the second gate signal.

21. The display device of claim 20, wherein a driving period of each pixel circuit among the plurality of pixel circuits includes:

an initialization period during which the pixel circuit is initialized;

a sampling period during which a threshold voltage of the driving element and the data voltage are stored in the capacitor; and a light emission period during which the light emitting element is driven to emit light, wherein a voltage of the first gate signal is a gate-on voltage during the initialization period, and the voltage of the first gate signal is a gate-off voltage during both of the sampling period and the light emission period;

wherein a voltage of the second gate signal is the gate-on voltage synchronized with the data voltage during the sampling period, and the voltage of the second gate signal is the gate-off voltage during both of the initialization period and the light emission period;

wherein a voltage of the third gate signal is the gate-on voltage during both of the sampling period and the light emission period, and the voltage of the third gate signal is the gate-off voltage during the initialization period;

wherein a voltage of the fourth gate signal is the gate-on voltage during the light emission period, and the voltage of the fourth gate signal is the gate-off voltage during both of the initialization period and the sampling period; and wherein each of the first through eight switch elements is configured to turn on in response to the gate-on voltage and turn off in response to the gate-off voltage.

* * * * *